United States Patent [19]
Sollars

[11] Patent Number: 5,923,894
[45] Date of Patent: Jul. 13, 1999

[54] ADAPTABLE INPUT/OUTPUT PIN CONTROL

[75] Inventor: Donald L. Sollars, Milpitas, Calif.

[73] Assignee: TeraGen Corporation, Mountain View, Calif.

[21] Appl. No.: 08/963,346

[22] Filed: Nov. 3, 1997

[51] Int. Cl.[6] .................................................. G06F 13/00
[52] U.S. Cl. ..................... 395/800.38; 395/500; 395/280
[58] Field of Search ........................ 395/800.01, 800.32, 395/800.38, 822, 828, 882, 280, 309, 500, 250, 376; 711/100, 154, 200; 326/37, 62, 101

[56] References Cited

U.S. PATENT DOCUMENTS

| | | | |
|---|---|---|---|
| 4,525,780 | 6/1985 | Bratt et al. . | |
| 5,218,707 | 6/1993 | Little et al. ........................ | 395/800.39 |
| 5,287,490 | 2/1994 | Sites . | |
| 5,369,772 | 11/1994 | Tubbs ........................................ | 326/39 |
| 5,375,209 | 12/1994 | Maher et al. ............................ | 395/500 |
| 5,404,469 | 4/1995 | Chung et al. . | |
| 5,430,862 | 7/1995 | Smith et al. . | |
| 5,438,668 | 8/1995 | Coon et al. . | |
| 5,511,182 | 4/1996 | Le et al. ................................... | 395/559 |
| 5,544,092 | 8/1996 | Gunther et al. .......................... | 395/651 |
| 5,557,760 | 9/1996 | Nishii et al. ............................. | 395/310 |
| 5,568,401 | 10/1996 | Narayanaswami . | |
| 5,574,873 | 11/1996 | Davidian . | |
| 5,574,927 | 11/1996 | Scantlin . | |
| 5,724,550 | 3/1998 | Stevens ................................... | 711/146 |
| 5,742,802 | 4/1998 | Harter et al. . | |
| 5,761,484 | 6/1998 | Agarwal et al. ........................ | 395/500 |
| 5,768,624 | 6/1998 | Ghosh ..................................... | 395/873 |

*Primary Examiner*—Alpesh M. Shah
*Attorney, Agent, or Firm*—Blakely, Sokoloff, Taylor & Zafman, LLP

[57] ABSTRACT

A pin control unit and a plurality of addressable storage locations are provided to an integrated circuit to control the input/output (I/O) pins of a functional block of the integrated circuit or the I/O pins of the integrated circuit. Multiple ones of the addressable storage locations are correspondingly coupled to I/O buffers associated with the I/O pins. The pin control unit selectively loads bit values into appropriate ones of the addressable storage locations. In response, the I/O buffers input bit values from and/or output bit values to the corresponding I/O pins. The pin control unit controls subsets of the I/O pins in a coordinated manner as I/O ports. The pin control unit also controls data movement between the addressable storage locations and various temporary storage elements of the functional block/integrated circuit.

38 Claims, 9 Drawing Sheets

ADAPTABLE INPUT/OUTPUT PIN CONTROL

BACKGROUND OF THE INVENTION

1. Field of the Invention

The present invention relates to the field of integrated circuits. More specifically, the present invention relates to the art of controlling input/output (I/O) of an integrated circuit, which applies equally to controlling I/O of a functional block of an integrated circuit of an embedded design type.

2. Background Information

All integrated circuits (or chips) have I/O pins to facilitate input and output of data values. Typically, the functional purposes of the I/O pins of a chip are defined, and combinatorial logic are employed to effectuate the functional behavior of the I/O pins. This prior art approach of employing combinatorial logic to control the I/O pins of a chip suffers from a number of disadvantages, including:

1. a large portion of the real estate of the chip being taken up by the I/O pin control combinatorial logic, and
2. the combinatorial logic must be redesigned for those I/O pins redefined with different functional purposes for different variants of the chip.

Thus, a more flexible or adaptable approach to controlling I/O of a chip is desired.

The above description including the disadvantages applies equally to functional blocks of integrated circuits that are of the embedded design type, where the functional blocks are inter-coupled by coupling the I/O signals of the functional blocks to on-chip buses, as if the functional blocks are physically different chips and the I/O signal lines are "I/O pins". Thus, a more flexible or adaptable approach to controlling I/O of a functional block of a chip is also desired.

As will be disclosed in more detail below, the present invention provides a more flexible and adaptable approach as desired. From the description to follow, these and other advantages will be apparent to those skilled in the art. In the description to follow, the term "I/O pin" is intended to include the emerging usage and meaning of the term, i.e. internal interface signal lines that are configured and managed as if they are external interface signal lines, as well as the historical usage and meaning of the term.

SUMMARY OF THE INVENTION

A pin control unit and a plurality of addressable storage locations are provided to an integrated circuit to control either the I/O pins of a functional block of the integrated circuit or the I/O pins of the integrated circuit. Multiple ones of the addressable storage locations are correspondingly coupled to I/O buffers associated with the I/O pins. The pin control unit selectively loads bit values into appropriate ones of the addressable storage locations. In response, the I/O buffers input bit values from and/or output bit values to the corresponding I/O pins.

In one embodiment, three addressable storage locations are employed for each I/O pin, one for the associated input buffer, and two for the pull-up and pull-down devices of the associated output buffer. Additionally, the pin control unit controls various subsets of the I/O pins in a coordinated manner to operate them as I/O ports. A port bus is provided for each I/O port to supply output data values to the addressable storage locations provided, and each I/O port is provided with a port register. The I/O port register and various temporary storage elements are coupled to the port buses to facilitate data movement between these elements and the I/O ports.

In one embodiment where the "external" bus is a multiplexed address/data bus, the pin control unit employs a pair of I/O ports to output an instruction fetch address, and one of the pair of I/O ports to receive the instruction fetched. Additionally, the pin control unit employs the pair of the I/O ports to output and input data values. The pin control unit also employs the pair of the I/O ports to perform general purpose I/O in a manner that is compliant with particular architectural requirements.

In one embodiment, the addressable storage locations provided for the input and output buffers associated with the I/O pins, the I/O port registers and various temporary storage elements are all disposed in a common storage structure. In one embodiment, the common storage structure is a cache memory.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1:
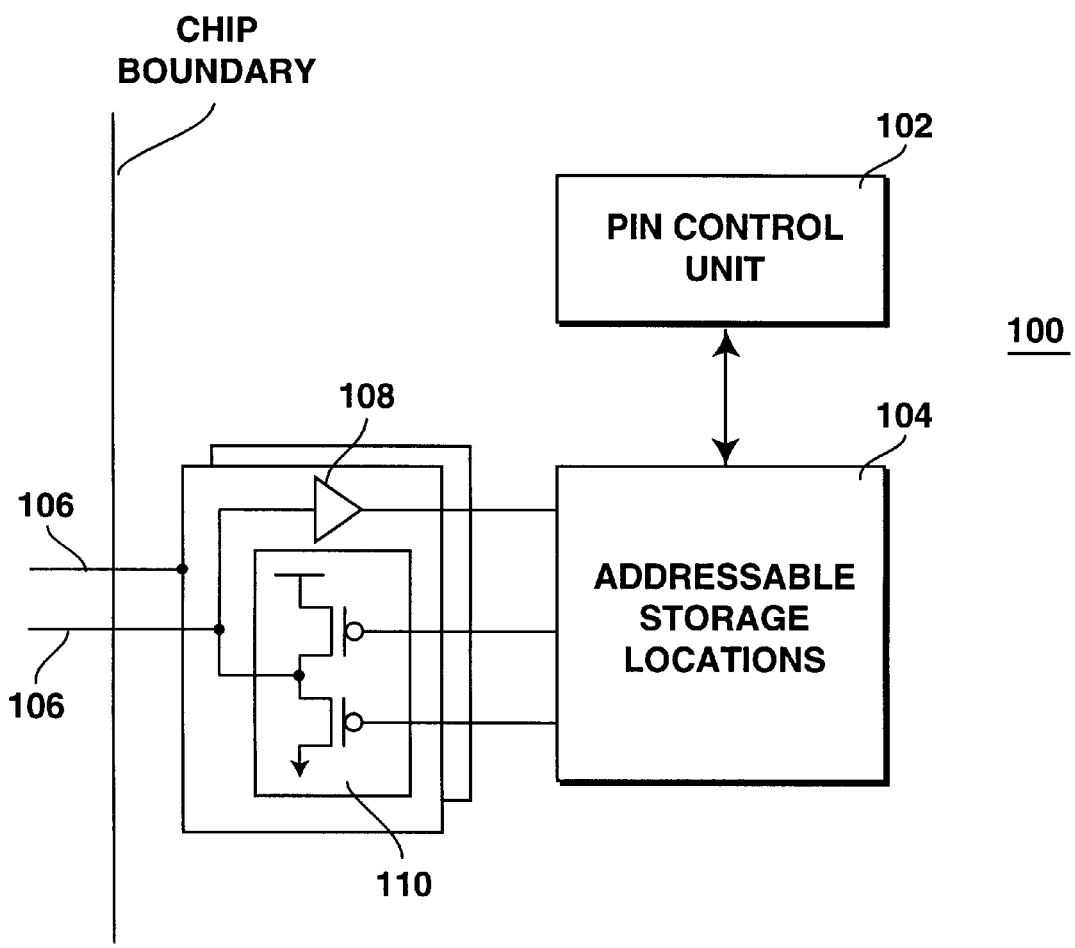
FIG. 1 illustrates one embodiment of an exemplary integrated circuit incorporated with the teachings of the present invention.

Referring now to FIG. 1, wherein a block diagram illustrating one embodiment of an integrated circuit incorporated with the teachings of the present invention is shown. As illustrated, in accordance with the teachings of the present invention, in lieu of conventional dedicated combinatorial logic, exemplary integrated circuit 100 is provided with pin control unit 102 and a number of addressable storage locations 104 to control 110 pins 106. For the illustrated embodiment, I/O pins 106 are conventional I/O pins disposed at the chip boundary of integrated circuit 100. As will be apparent from the description to follow, the present invention may also be practiced with I/O pins 106 disposed at internal block boundaries of integrated circuit 100, i.e. I/O pins 106 being I/O signal lines of a functional block of integrated circuit 100 that interface to an on-chip bus as if they are I/O "pins".

As will be described in more details below, multiple ones of addressable storage locations 104 are correspondingly coupled to I/O buffers 108 and 110 associated with I/O pins 106, to facilitate control of I/O pins 106 by pin control unit 102. Pin control unit 102 effectuates control of I/O pins 106 by selectively loading bit values into appropriate ones of addressable storage locations 104. In response to the loaded bit values, I/O buffers 108 and 110 input bit values from and/or output bit values to corresponding I/O pins 106. As a result, I/O pins 106 are flexibly managed by pin control unit 102 (as opposed to being dedicated to any specific hardware resource), the amount of real estate of integrated circuit 100 consumed for controlling I/O pins 106 is reduced, and alteration of the functional characteristics of I/O pins 106 can be effectuated more easily between variants of integrated circuit 100 by modifying pin control unit 102. For example, pin control unit 102 can be designed to support one bus protocol in one variant of integrated circuit 100, such as a multiplexed address/bus protocol, and easily modified to support another bus protocol in another variant of integrated circuit 100, such as a demultiplexed parallel address and bus protocol.

Addressable storage locations 104, input and output buffers 108 and 110, as well as I/O pins 106 are intended to represent a broad category of these elements known in the art. The operating logic of pin control unit 102 will be described in more details below. As will be readily apparent from the description to follow, pin control unit 102 may be implemented strictly in hardware or in hardware and software combination, using any number of circuitry and programming techniques known in the art.

It should be noted that while for the illustrated embodiment, only one pin control unit 102 is employed, and employment of a singular pin control unit 102 is presently preferred, nevertheless, the present invention may be practiced employing more than one pin control unit 102 without sacrificing all the advantages of the present invention. Accordingly, except for the innovative employment of pin control unit 102 and addressable storage locations 104 to control I/O pins 106, integrated circuit 100 may be any one of a broad range of integrated circuits, including in particular processors or integrated circuit designs with embedded processors. The term processor as used herein is intended to include micro-controllers (MCU), digital signal processors (DSP), general purpose microprocessors (uP), and the like.

Figure 2A:
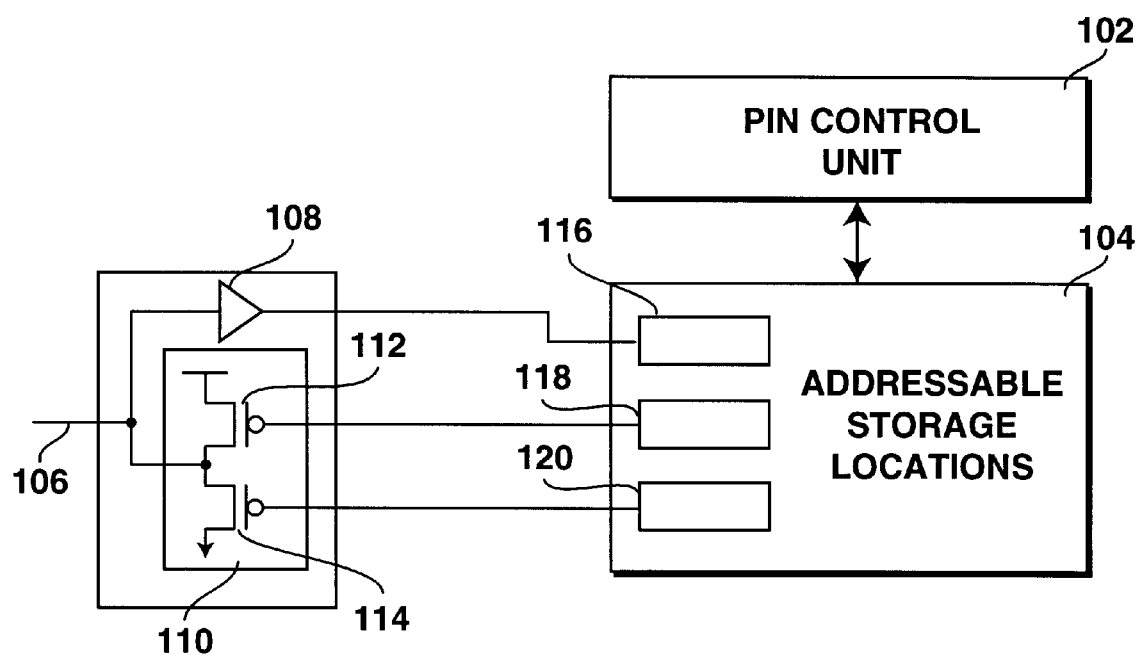
FIGS. 2a–2b illustrate the employment of addressable storage locations for the I/O buffers associated with the I/O pins in further detail.

FIG. 2a illustrates the usage of addressable storage locations 104 in further detail, in accordance with one embodiment of the present invention. For the illustrated embodiment, three addressable storage locations 116–120 of addressable storage locations 104 are employed for each I/O pin 106, one addressable storage location 116 for associated input buffer 108, and two addressable storage locations 118–120 for associated output buffer 110, more specifically, pull-up and pull-down devices 112 and 114 of associated output buffer 110. Addressable storage locations 116–120 are correspondingly and directly coupled to input buffer 108 and pull-up and pull-down devices 112–114 of output buffer 110.

To output a data bit, pin control unit 102 writes the data bit into both addressable storage locations 118 and 120 for pull-up and pull-down devices 112 and 114 of associated output buffer 110 of I/O pin 106. To input a data bit, pin control unit 102 writes control bits into the same two addressable storage locations 118–120 to simultaneously disable pull-up and pull-down devices 112–114 of associated output buffer 110 of I/O pin 106, and enable the associated input buffer 108 of I/O pin 106 to provide the input data bit to addressable storage location 116.

In one embodiment, pull-up device 112 is enabled responsive to an active low signal, and disabled responsive to a high signal, whereas pull-down device 114 is enabled responsive to an active high signal, and disabled responsive to a low signal. For this embodiment, pin control unit 102 writes a "1" and a "0" into addressable storage locations 118 and 120 respectively, to simultaneously disable pull-up and pull-down devices 112 and 114, and enable input through input buffer 108.

Figure 2B:
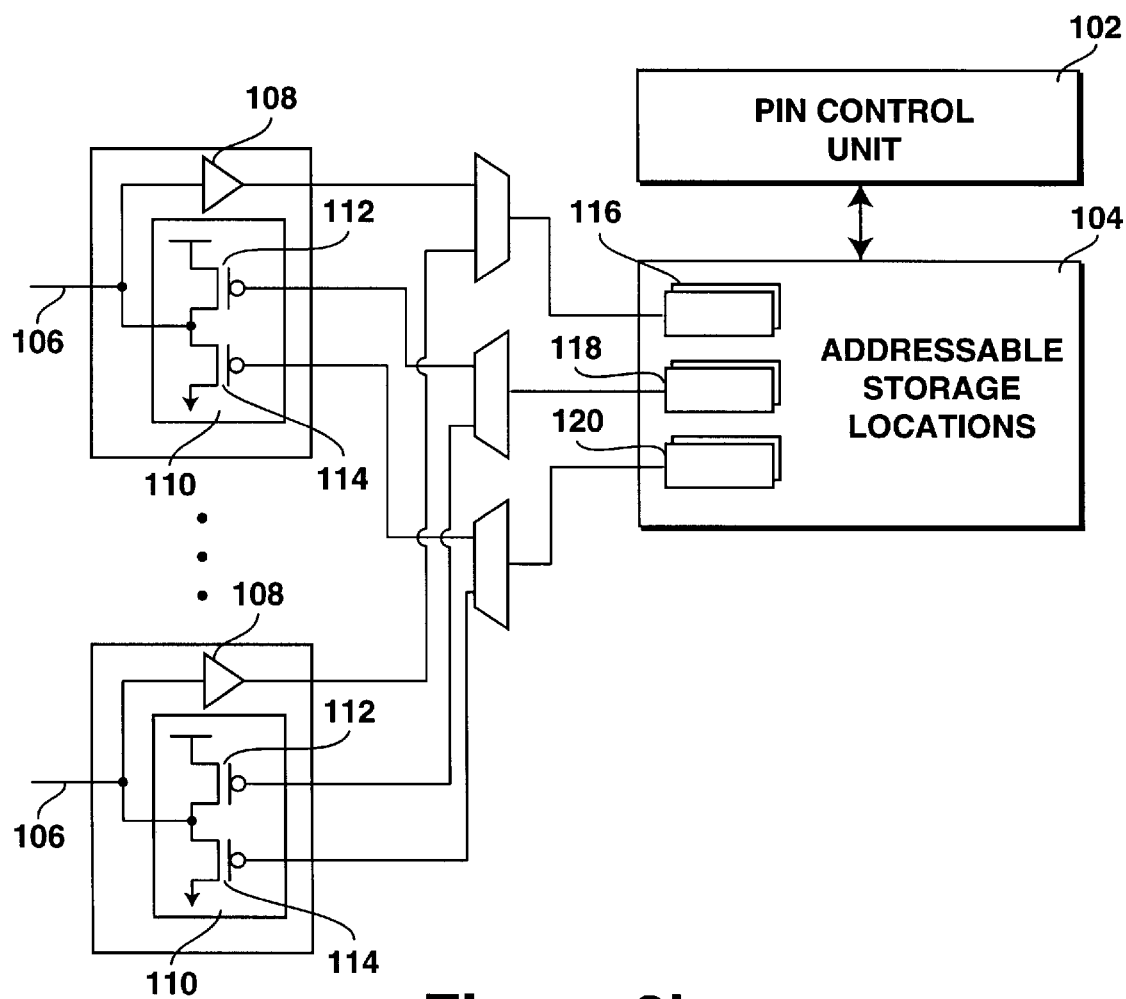

FIG. 2b illustrates an alternative embodiment for coupling addressable storage locations 116–120 to input buffer 108 and pull-up and pull-down devices 112–114 of output buffer 110 associated with I/O pin 106. In this alternate embodiment, inputs from input buffers 108 associated with multiple I/O pins 106 are multiplexed to their corresponding addressable storage locations 116 using one or more multiplexors 121, whereas outputs from addressable storage locations 118–120 are de-mutiplexed to pull-up and pull-down devices 112 and 114 of output buffers 110 associated with multiple I/O pins 106 using one or more de-multiplexors 123. Other alternative embodiments may also be employed.

Figure 3:
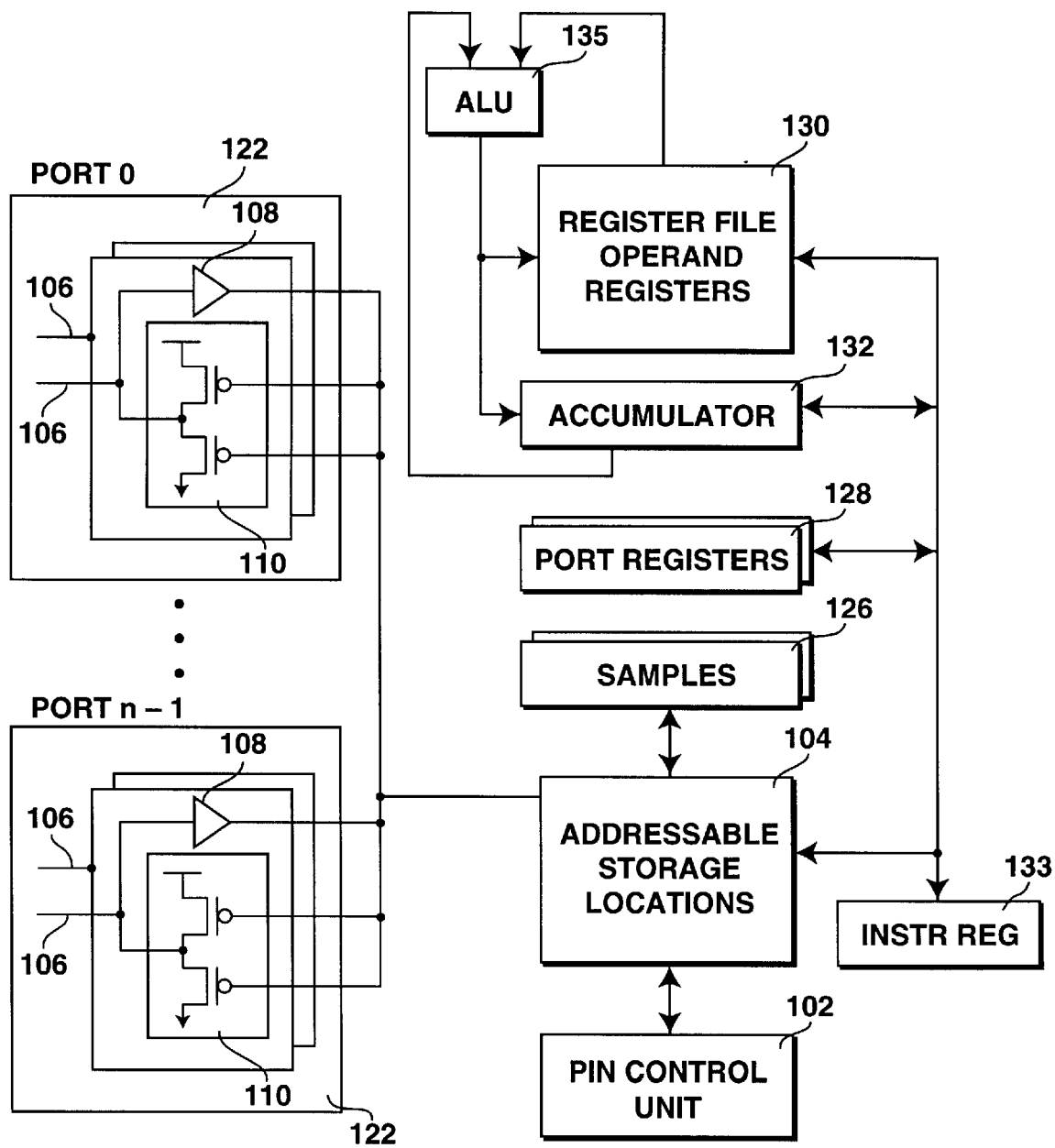
FIG. 3 illustrates a logical organization of the I/O pins.

FIG. 3 illustrates a logical organization of I/O pins 106 in accordance with one embodiment of the present invention. As shown, for the illustrated embodiment, pin control unit 102 controls various subsets of I/O pins 106 in a coordinated manner to operate the various subsets of I/O pins 106 as I/O ports 122. For example, eight I/O pins 106 may be operated together in a coordinated manner as a bi-directional I/O port 122 for inputting or outputting a byte of data at a time. Two I/O ports 122 may be operated together to output for example a 16 bit address.

For the illustrated embodiment, a port bus 124 is provided for each I/O port 122 to couple the I/O port 122 to various temporary storage elements of integrated circuit 100 to supply output data values to addressable storage locations 118 and 120 provided for pull-up and pull-down devices 112 and 114 of the associated output buffers 110 of I/O pins 106 of the I/O port 122, and to receive input data values from addressable storage locations 116 provided for input buffers 108 of I/O pins 106 of the I/O port 122. For the illustrated embodiment, the temporary storage elements include operand registers 130 and accumulator 132 of integrated circuit 100 that operate to supply the output data to addressable storage locations 118 and 120, and to receive input data from addressable storage location 116. Operand registers 130 and accumulator 132 are also coupled to ALU 135. In like manner, instruction buffer 133 is also coupled to selected ones of port buses 124 to receive fetched instructions from addressable storage locations 116.

For the illustrated embodiment, an addressable storage location 126 is also provided to complement each addressable storage location 116 corresponding to the input buffer 108 of an associated I/O pin 106, to store a sampled version of the input data bit stored in the corresponding addressable storage location 116. Additionally, a port register 128 is provided for each I/O port 122. Port registers 128 are also correspondingly coupled to port buses 124.

In one embodiment, addressable storage locations 104, addressable storage locations 126, port registers 128, operand registers 130, accumulator 132 and instruction register 133 are all disposed in a common physical storage structure. In one embodiment, the common physical storage structure is a cache memory. In one embodiment, the cache memory is further provided with a special port (p-port) to load values into addressable storage locations 104 associated with controlling I/O pins 106.

Thus, under the present invention, data movement between I/O pins 106 and temporary storage elements of integrated circuit 100 can be easily and efficiently accomplished. In particular, ALU 135 can write to any one of I/O pins 106 easily by way of accumulator 132. No intermediate registers are necessary to input data values from I/O pins 106 to accumulator 132 or output data values from accumulator 132 to I/O pins 106. Similarly, input and output data values can be moved easily between operand registers 130 and I/O pins 106. Of special importance is the fact, under the present invention, instructions can directly control the behavior of an I/O port, making it relatively easily to cause I/O ports 122 to behave in conformance to any one of a number instruction set architecture (ISA).

Figure 4:
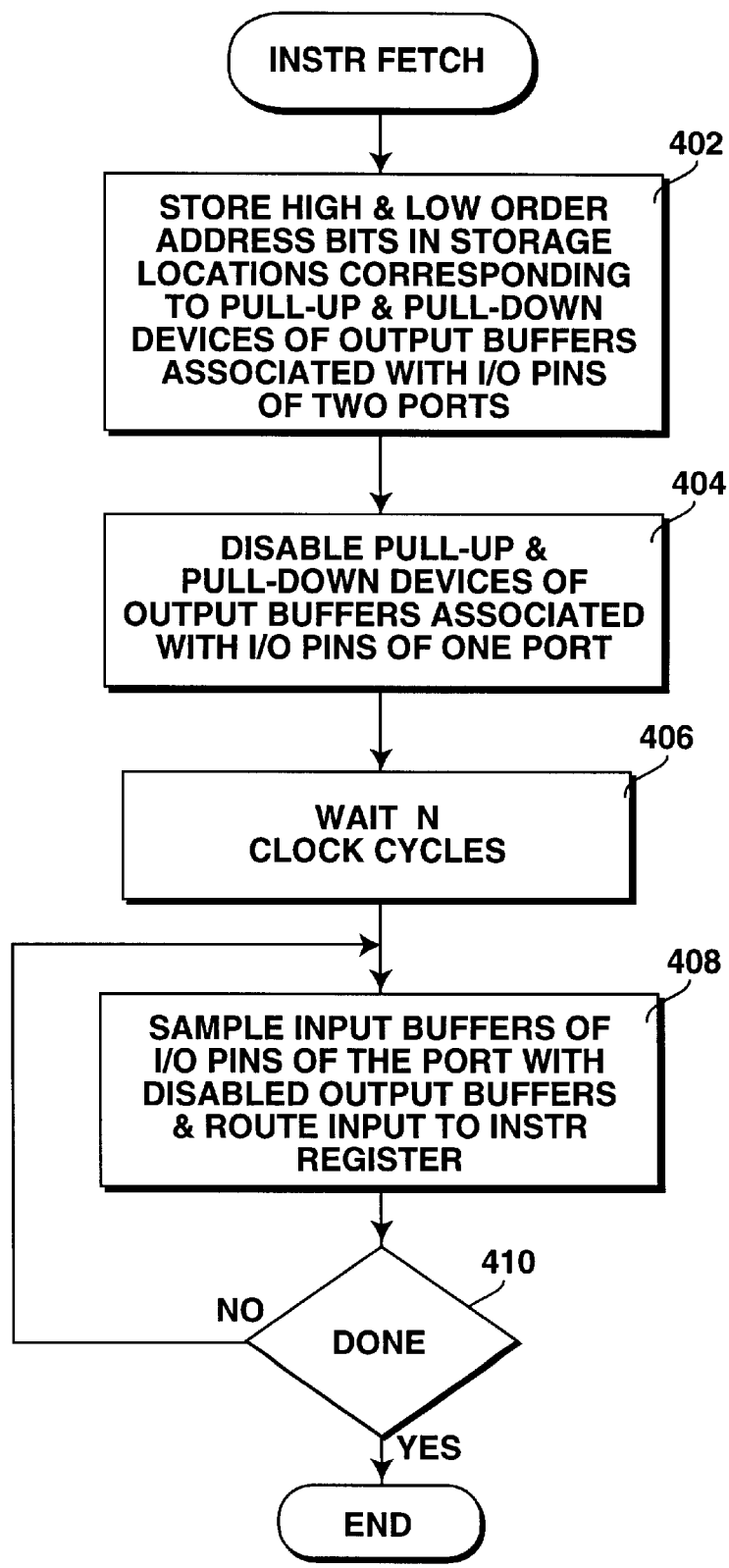
FIG. 4 illustrates one embodiment of the operational steps of pin control unit for controlling a number of I/O pins to fetch an instruction.

FIG. 4 illustrates one embodiment of the operational steps of pin control unit for controlling a number of the input/output (I/O) pins to fetch an instruction, e.g. from an external memory. The illustration is presented in the context of the "external" bus coupled to I/O pins being a multiplexed address/data bus, where the data size is half the address size. At step 402, pin control unit causes the lower order address bit values to be stored in the addressable storage locations corresponding to the pull-up and pull-down devices of the output buffers associated with the I/O pins of one of the I/O ports, and the higher order address bit values to be stored in the addressable storage locations corresponding to the pull-up and pull-down devices of the output buffers associated with the I/O pins of another one of the I/O ports. As described earlier, in response, the output buffers associated with the I/O pins of the I/O ports output the lower and the higher order address bits. At step 404, pin control unit causes a pair of control bit values to be stored in the addressable storage locations corresponding to the output buffers associated with the I/O pins of a predetermined one of the two I/O ports, to disable the pull-up and pull-down devices of the output buffers associated with the I/O pins of the predetermined one of the two I/O ports, and enable the input buffers associated with the I/O pins of the predetermined one of the two I/O ports to input the instruction being fetched.

At step 406, pin control unit waits a predetermined number of clock cycle. At step 408, pin control unit starts causing the input values stored in the addressable storage locations corresponding to the input buffers associated with the I/O pins of the predetermined one of the I/O ports to be sampled and routed to an instruction buffer, to accept the instruction being returned. Step 408 is repeated until the entire instruction has been received.

In an alternate embodiment, the "external" bus is a de-multiplexed fully parallel address and data bus. The "external" bus is coupled to three I/O ports, two for address and one for data. For this embodiment, step 404 may be skipped, i.e. the simultaneous disabling of pull-up and pull-down devices 112–114 of output buffers 110 associated with I/O pins 106 of one of the address ports is no longer necessary. In yet another embodiment, the "external" bus is a highly multiplexed address and data bus coupled to one I/O port, where the high and lower order bits of an address and the data are to driven in sequence. For this embodiment, step 402 will have to be performed in two parts. In general, any one of a number of "external" buses of various protocols and address/data sizes may be employed.

Figure 5:
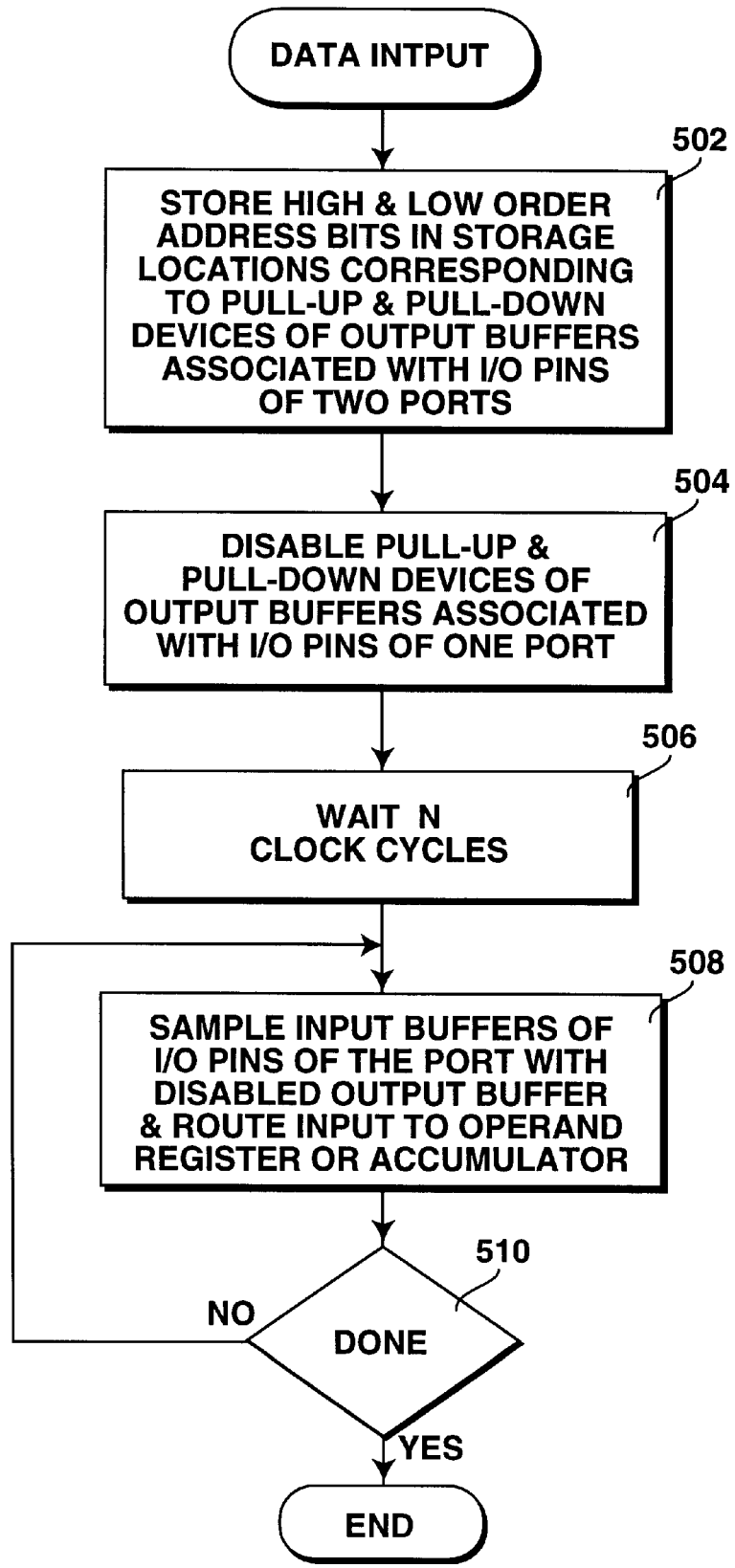
FIGS. 5–6 illustrate one embodiment each of the operational steps of pin control unit for controlling a number of I/O pins to input and output data values.
Figure 6:
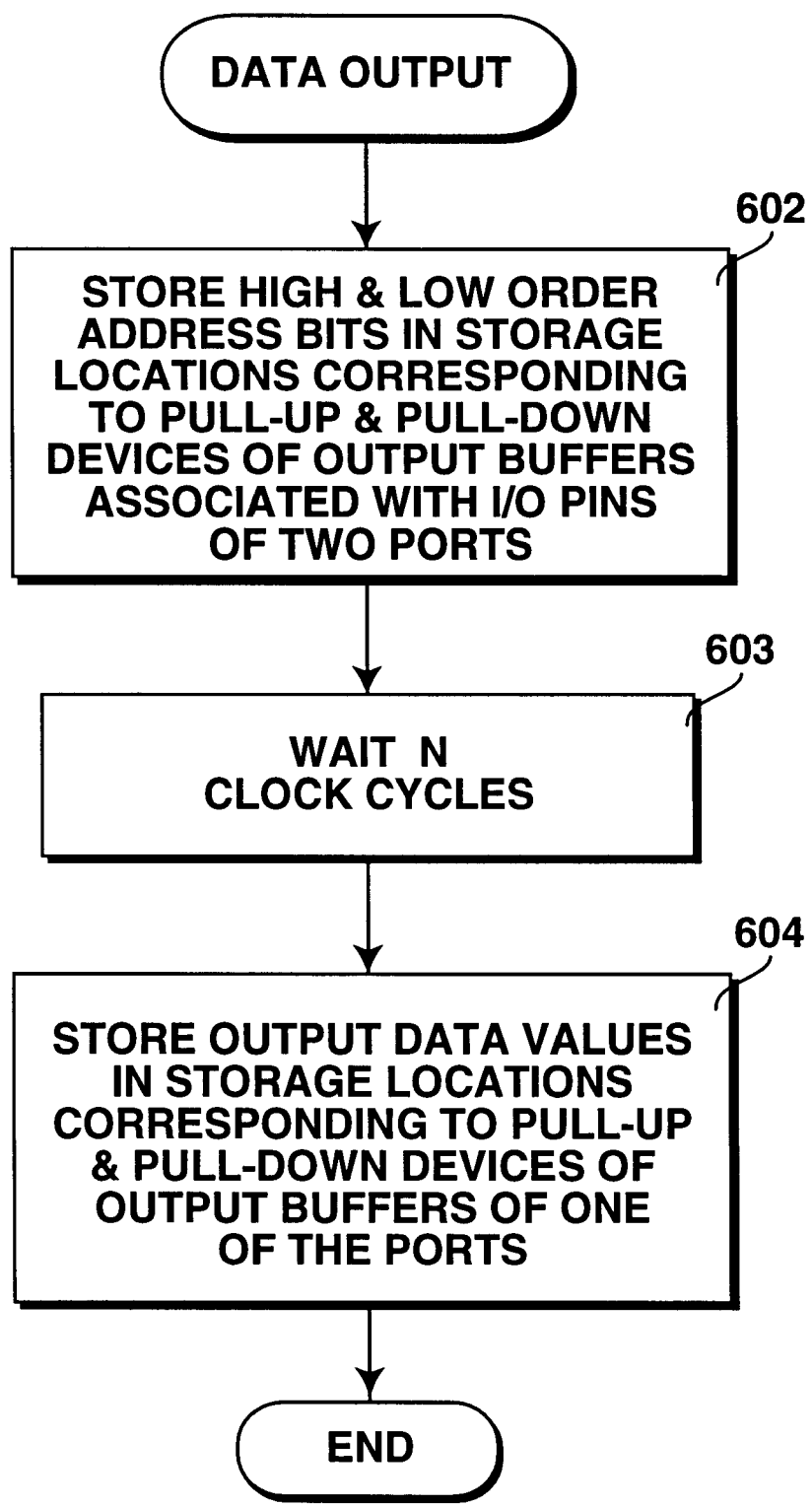

FIGS. 5 and 6 illustrate one embodiment each of the operational steps of pin control unit for controlling a number of the input/output (I/O) pins to input and output a data value respectively, e.g. from/to an external memory. Similarly, for this illustration, the description is given in the context of a multiplexed address/data bus, where the data size is half the address size. Each of steps 502 and 602 is basically the same as step 402. In the case of inputting a data value, steps 504 and 506 are basically the same as steps 404 and 406, whereas step 508 is similar to step 408, except for the fact that the sampled input data are routed to either an operand register or the accumulator instead. In the case of outputting a data value, upon performing step 602, at step 604, pin control unit causes the output data value to be stored in the addressable storage locations corresponding to the output buffers associated with the I/O pins of a predetermined one of the two I/O ports. As described earlier, in response, the output buffers associated with the I/O pins of the I/O port output the output data value.

Likewise, in an alternate embodiment, the "external" bus may be a demultiplexed fully parallel address and data bus. The "external" bus is coupled to three I/O ports, two for address and one for data. For this embodiment, steps 504, the simultaneous disabling step may be skipped, whereas step 604 is performed against a data port, as opposed to one of the address ports. Similarly, in yet another embodiment, the "external" bus is a highly multiplexed address and data bus coupled to one I/O port, where the high and lower order bits of an address and the data are to driven in sequence. For this embodiment, steps 502 and 602 will have to be performed in two parts. In general, any one of a number of "external" buses of various protocols and address/data sizes may also be employed.

Figure 7:
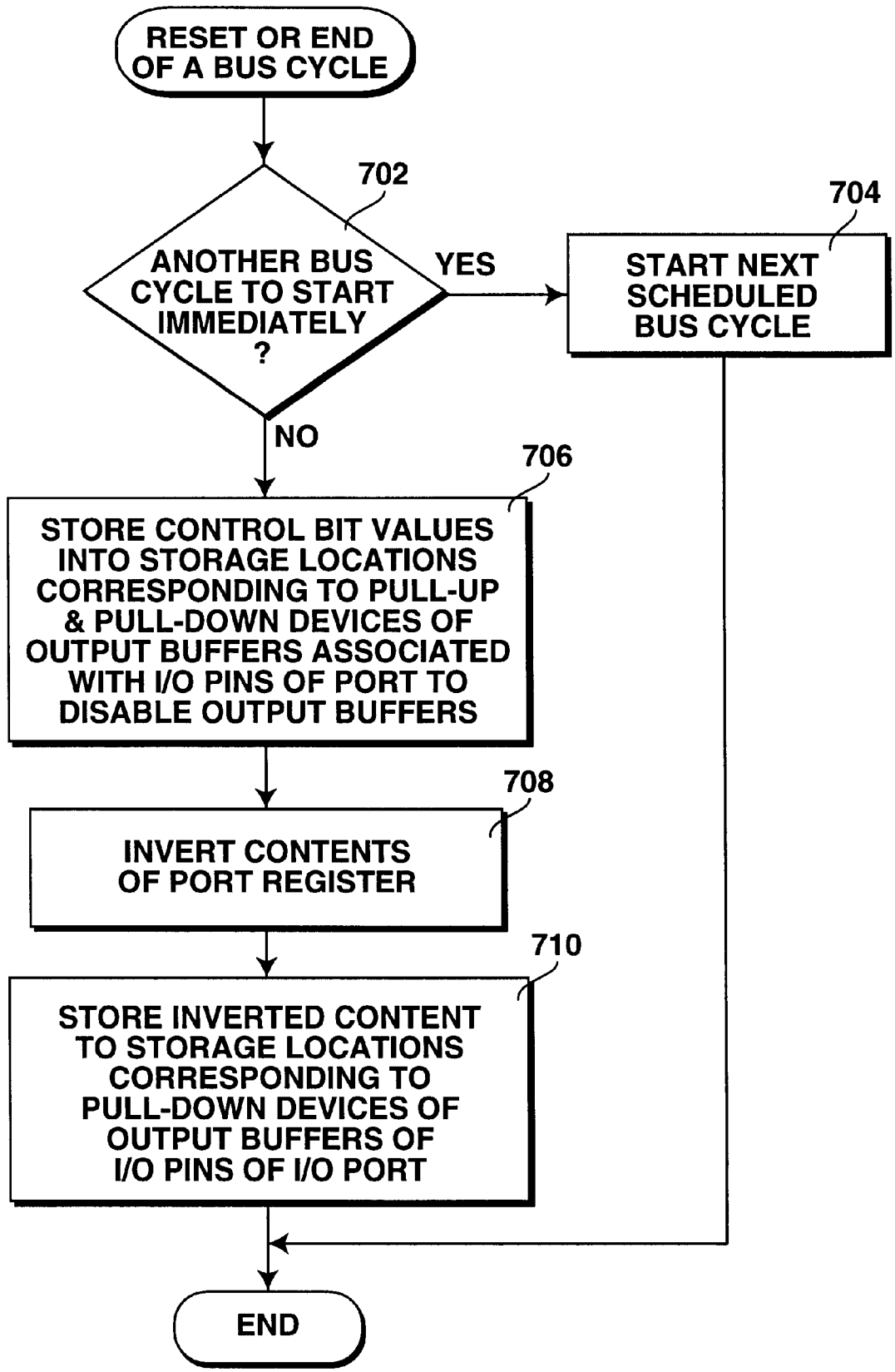
FIGS. 7–8 illustrate one embodiment each of the operational steps of pin control unit for controlling a number of I/O pins to perform general purpose I/O, and at the same time, meeting certain architectural requirements.

FIG. 7 illustrates one embodiment of the operational steps of pin control unit for controlling a number of the input/output (I/O) pins to perform general purpose I/O and presenting the particular I/O pins as open drains, in compliant with a particular architectural requirement. As shown, at step 702, at reset or at the end of a bus cycle, pin control unit determines if a subsequent bus cycle is scheduled to begin immediately. If a subsequent bus cycle is scheduled to begin immediately, pin control unit causes the scheduled bus cycle to begin, step 704, e.g. performing the steps of FIG. 4, 5 or 6. On the other hand, if a subsequent bus cycle is not scheduled to begin immediately, pin control unit causes a pair of control bit values to be stored into the addressable storage locations corresponding to the pull-up and pull-down devices of the output buffers associated with the I/O pins of the I/O, to simultaneously disable the pull-up and the pull-down devices, step 706. Next, pin control unit causes the contents of the port register corresponding to the I/O pins of the I/O port to be inverted, step 708 and then stored into the addressable storage locations corresponding to the pull-down devices of the output buffers associated with the I/O pins of the I/O port, step 710.

Figure 8:
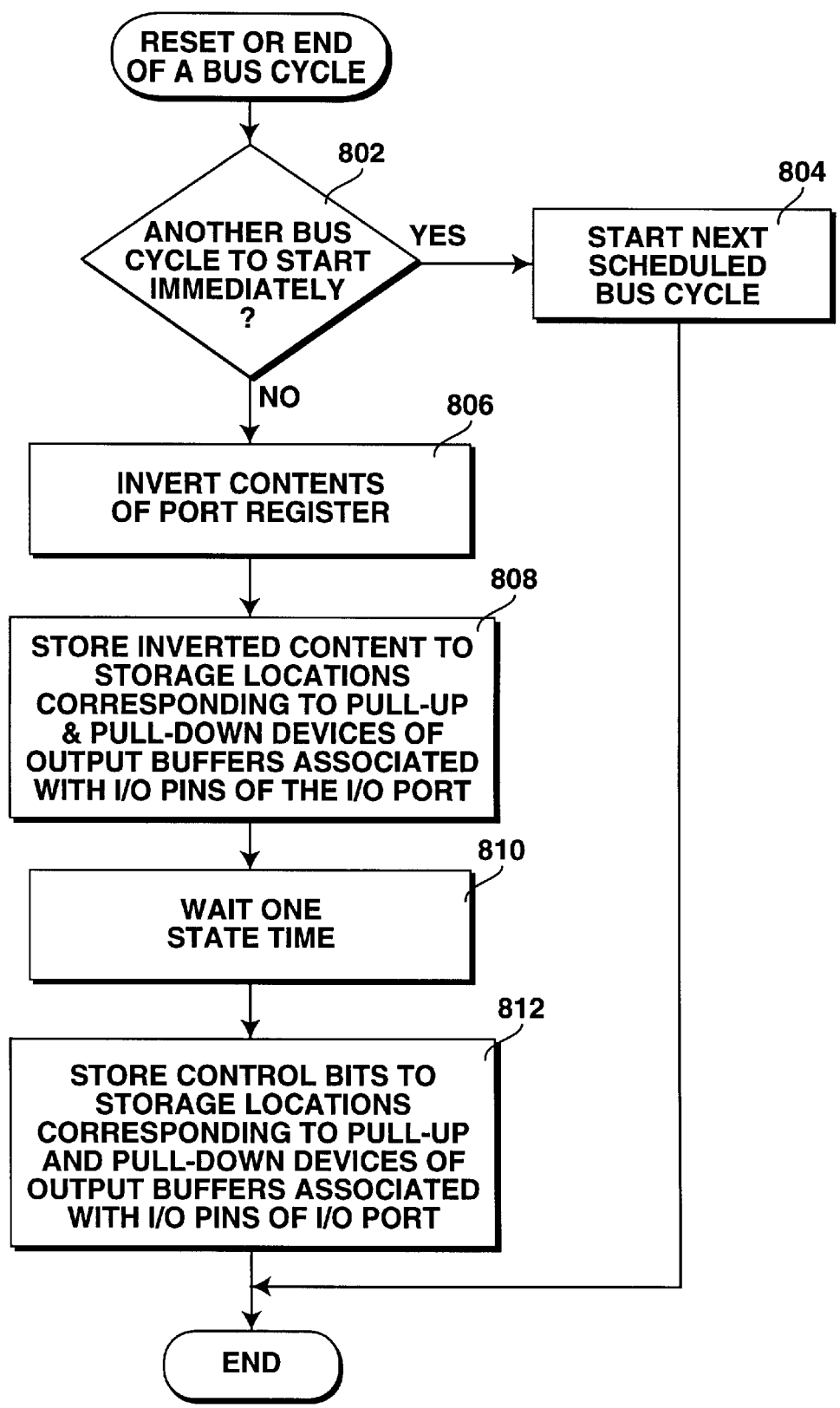

FIG. 8 illustrates one embodiment of the operational steps of pin control unit 102 for controlling a number of the input/output (I/O) pins 106 to perform general purpose I/O, and when used for driving address outputs, the output be driven strongly, and yet may be used for input within one state time, in compliant with an architectural requirement. As shown, at step 802, at reset or at the end of a bus cycle, pin control unit determines if a subsequent bus cycle is scheduled to begin immediately. If a subsequent bus cycle is scheduled to begin immediately, pin control unit causes the scheduled bus cycle to begin, step 804, e.g. performing the steps of FIG. 4, 5 or 6. On the other hand, if a subsequent bus cycle is not scheduled to begin immediately, pin control unit causes the contents of the port register corresponding to the I/O pins of the I/O port to be inverted, step 806 and then stored into the addressable storage locations corresponding to the pull-up and the pull-down devices of the output buffers associated with the I/O pins of the I/O port, step 808. Next, pin control unit waits for one state time, step 810. At step 812, upon waiting for the required one state time, pin control unit causes a pair of control bit values to be stored into the addressable storage locations corresponding to the pull-up and pull-down devices of the output buffers associated with the I/O pins of the I/O port, to disable the pull-up and pull-down devices of the output buffers.

Whereas the above described embodiments have been selected for illustration to facilitate ease of understanding of the present invention, those skilled in the art will recognize that the present invention is not limited to these embodiments. Various modifications and alterations, within the spirit and scope of the appended claims, may be made. The above description is thus to be regarded as illustrative instead of restrictive on the present invention.

Accordingly, an adaptable method and apparatus for controlling I/O pins of an integrated circuit, and controlling I/O pins of a functional block of an integrated circuit has been disclosed.

What is claimed is:

1. An apparatus comprising:
   a plurality of input/output (I/O) pins;
   a first plurality of addressable storage locations;
   a pin control unit coupled to the first plurality of addressable storage locations that operates to selectively load a plurality of bit values in appropriate ones of the first plurality of addressable storage locations; and
   a plurality of pairs of I/O buffers correspondingly coupled to the first plurality of addressable storage locations and to the I/O pins that operate to input bit values from and/or output bit values to the corresponding I/O pins responsive to the bit values selectively loaded into the corresponding addressable storage locations.

2. The apparatus as set forth in claim 1, wherein the first plurality of addressable storage locations include a first and a second addressable storage location for each I/O pin where the pin control unit operates to load an output bit value in both the first and second addressable storage locations for a pull-up and a pull-down device of an output one of the pair of I/O buffers corresponding to the I/O pin to output the output bit value to the I/O pin.

3. The apparatus as set forth in claim 1, wherein the first plurality of addressable storage locations include a first addressable storage location for each I/O pin to load an input bit value received from the I/O pin at an input one of the pair of I/O buffers corresponding to the I/O pin.

4. The apparatus as set forth in claim 3, wherein the first plurality of addressable storage locations further include a second and a third addressable storage location for each I/O pin where the pin control unit operates to load a first and a second bit value in the second and third addressable storage locations respectively to simultaneously disable a pull-up and a pull-own device of an output one of the pair of I/O buffers corresponding to the I/O pin, to facilitate receipt of the input bit value from the I/O pin by the input buffer corresponding to the I/O pin.

5. The apparatus as set forth in claim 3, wherein the apparatus further includes a second plurality of addressable storage locations including a second addressable storage location for each I/O pin coupled to said first addressable storage location corresponding to the I/O pin for storing a sampled version of the input bit value at a point in time.

6. The apparatus as set forth in claim 1, wherein the pin control unit operates a first subset of the I/O pins in a coordinated manner as a first I/O port to input an input data value comprising a plurality of input bit values or to output an output data value comprising a plurality of output bit values.

7. The apparatus as set forth in claim 6, wherein the apparatus further comprises a first bus coupled to a first and a second addressable storage location corresponding to each of the I/O pins of said first subset of I/O pins to supply the output bit values of the output data value for the first and second addressable storage locations corresponding to each of the I/O pins of said first subset of I/O pins.

8. The apparatus as set forth in claim 6, wherein the apparatus further includes a second plurality of addressable storage locations including an addressable storage location for each I/O pin of the first subset of I/O pins, correspondingly coupled to the addressable storage locations of the first plurality of addressable storage locations coupled to the I/O pins of the first subset of I/O pins, to operate as a register of the first I/O port.

9. The apparatus as set forth in claim 8, wherein the first as well as the second plurality of addressable storage locations are addressable storage locations of a common storage structure.

10. The apparatus as set forth in claim 6, wherein the apparatus further comprises:
    a first bus coupled to a first and a second addressable storage location corresponding to each of the I/O pins of said first subset of I/O pins to supply the output bit values of the output data value for the first and second addressable storage locations corresponding to each of the I/O pins of said first subset of I/O pins; and
    a second plurality of addressable storage locations coupled to the first bus and to a third addressable storage location of the first plurality of addressable storage locations corresponding to each of the I/O pins of said first subset of I/O pins that operates as a register or an accumulator to supply the output bit values or to receive the input bit values to and from the first subset of I/O pins.

11. The apparatus as set forth in claim 10, wherein the first as well as the second plurality of addressable storage locations are addressable storage locations of a common storage structure.

12. The apparatus as set forth in claim 6, wherein the pin control unit operates a second subset of the I/O pins in a coordinated manner as a second I/O port to input another input data value comprising a plurality of input bit values or to output another output data value comprising a plurality of output bit values.

13. A method for controlling a plurality of input/output (I/O) pins comprising the steps of:
    a) selectively storing a plurality of bit values into appropriate ones of a first plurality of addressable storage locations associated with the I/O pins by a pin control unit; and
    b) in response, outputting bit values by output buffers associated with applicable ones of the I/O pins to the applicable I/O pins, and/or inputting bit values by input buffers associated with applicable ones of the I/O pins from the applicable I/O pins to appropriate ones of the first plurality of addressable storage locations associated with the applicable I/O pins.

14. The method as set forth in claim 13, wherein
  step (a) comprises storing an output bit value in a first and an addressable storage location associated with an I/O pin by the pin control unit; and
  step (b) comprises, in response, outputting the output bit value by an applicable one of a pull-up or a pull-down device of an output buffer associated with the I/O pin.

15. The method as set forth in claim 13, wherein
  step (a) comprises storing a first and a second bit value in a first and a second addressable storage location associated with an I/O pin; and
  step (b) comprises, in response, disabling a pull-up and a pull-own device of an output buffer of the I/O pin, and storing an input bit value received at an input buffer of the I/O pin in a third addressable storage location.

16. The method as set forth in claim 15, wherein the method further comprises step (c) sampling the input bit value at a point in time, and storing the sampled version of the input bit value in a fourth addressable storage location of a second plurality of addressable storage locations.

17. The method as set forth in claim 13, wherein
  step (a) comprises storing the bit values into appropriate ones of the addressable storage locations associated with a first subset of the I/O pins in a coordinated manner, operating the first subset of the I/O pins as a first I/O port; and
  step (b) comprises, in response, either inputting an input data value comprising a plurality of input bit values by input buffers associated with the first subset of the I/O pins or outputting an output data value comprising a plurality of output bit values by the output buffers associated with the first subset of I/O pins.

18. The method as set forth in claim 17, wherein step (a) comprises supplying the output bit values of the output data value for the first and second addressable storage locations associated with each of the I/O pins of said first subset of I/O pins through a first port bus.

19. The method as set forth in claim 17, wherein the method further comprises step (c) operating a second plurality of addressable storage locations including an addressable storage location for each I/O pin of the first subset of I/O pins as a register of the first I/O port, the addressable storage locations of the second plurality of addressable storage locations being associated with the I/O pins of the first subset of I/O pins and correspondingly coupled to the addressable storage locations of the first plurality of addressable storage locations associated with the I/O pins of the first subset of I/O pins.

20. The method as set forth in claim 19, wherein steps (a) and (c) are performed against a common storage structure comprising the first as well as the second plurality of addressable storage locations.

21. The method as set forth in claim 17, wherein
  step (a) comprises supplying the output bit values of the output data value for the first and second addressable storage locations associated with each of the I/O pins of said first subset of I/O pins through a first port bus;
  the method further comprises the step (c) operating a second plurality of addressable storage locations as a register or an accumulator to supply the output bit values or to receive the input bit values to and from the first subset of I/O pins, the second plurality of addressable storage locations being coupled to the first bus and to a third addressable storage location of the first plurality of addressable storage locations associated with each of the I/O pins of said first subset of I/O pins.

22. The method as set forth in claim 21, wherein steps (a) and (c) are performed against a common storage structure comprising the first as well as the second plurality of addressable storage locations.

23. The method as set forth in claim 17, wherein
  step (a) further comprises storing the bit values into appropriate ones of the addressable storage locations associated with a second subset of the I/O pins in a coordinated manner, operating the second subset of the I/O pins as a second I/O port; and
  step (b) comprises, in response, either inputting an input data value comprising a plurality of input bit values by input buffers associated with the second subset of the I/O pins or outputting an output data value comprising a plurality of output bit values by the output buffers associated with the second subset of I/O pins.

24. A method for controlling a plurality of input/output (I/O) pins to fetch an instruction, comprising the steps of:
  a) storing a first plurality of address bit values to a first as well as a second plurality of addressable storage locations correspondingly coupled to pull-up and pull-down devices of a first plurality of output buffers associated with a first plurality of I/O pins by a pin control unit controlling the I/O pins, to output the first plurality of address bit values;
  b) storing a second plurality of address bit values to a third as well as a fourth plurality of addressable storage locations correspondingly coupled to pull-up and pull-down devices of a second plurality of output buffers associated with a second plurality of I/O pins by the pin control unit, to output the second plurality of address bit values;
  c) receiving a plurality of input bit values from a plurality of input buffers associated with a third plurality of I/O pins; and
  d) repeating step (c) a number of times to receive all input bit values for the instruction.

25. The method as set forth in claim 24, wherein
  the first and third plurality of I/O pins are the same I/O pins; and
  step (c) further comprises storing a first and a second plurality of control bit values to the first and the second plurality of addressable storage locations respectively to disable the pull-up and pull-down devices of the first plurality of output buffers associated with the first plurality of I/O pins by the pin control unit.

26. The method as set forth in claim 25, wherein the first and second plurality of
  I/O pins are also the same I/O pins.

27. A method for controlling a plurality of input/output (I/O) pins to input a data value, comprising the steps of:
  a) storing a first plurality of address bit values to a first as well as a second plurality of addressable storage locations correspondingly coupled to pull-up and pull-down devices of a first plurality of output buffers associated with a first plurality of I/O pins by a pin control unit controlling the I/O pins, to output the first plurality of address bit values;
  b) storing a second plurality of address bit values to a third as well as a fourth plurality of addressable storage locations correspondingly coupled to pull-up and pull-down devices of a second plurality of output buffers associated with a second plurality of I/O pins by the pin control unit, to output the second plurality of address bit values; and c) receiving a plurality of input bits of the data value from a plurality of input buffers associated with a third plurality of I/O pins.

28. The method as set forth in claim 27, wherein the first and third plurality of I/O pins are the same I/O pins; and step (c) further comprises storing a first and a second plurality of control bit values to the first and the second plurality of addressable storage locations respectively to disable the pull-up and pull-down devices of the first plurality of output buffers associated with the first plurality of I/O pins by the pin control unit.

29. The method as set forth in claim 28, wherein the first and second plurality of I/O pins are also the same I/O pins; and the first and second plurality of addressable storage locations, and the third and fourth plurality of address storage locations are also the same addressable storage locations.

30. A method for controlling a plurality of input/output (I/O) pins to output a data value, comprising the steps of:

a) storing a first plurality of address bit values to a first as well as a second plurality of addressable storage locations correspondingly coupled to pull-up and pull-down devices of a first plurality of output buffers associated with a first plurality of I/O pins by a pin control unit controlling the I/O pins, to output the first plurality of address bit values;

b) storing a second plurality of address bit values to a third as well as a fourth plurality of addressable storage locations correspondingly coupled to pull-up and pull-down devices of a second plurality of output buffers associated with a second plurality of I/O pins by the pin control unit, to output the second plurality of address bit values; and c) storing a plurality of data bit values of the data value to a fifth as well as a sixth plurality of addressable storage locations corresponding to the pull-up and pull-down devices of the first plurality of output buffers associated with a third plurality of I/O pins by the pin control unit to output the data bit values of the data value.

31. The method as set forth in claim 30, wherein the first and third plurality of I/O pins are the same I/O pins; and the first and second plurality of addressable storage locations, and the fifth and sixth plurality of address storage locations are the same addressable storage locations.

32. The method as set forth in claim 31, wherein the first and second plurality of I/O pins are the same I/O pins; and the first and second plurality of addressable storage locations, and the third and fourth plurality of address storage locations are also the same addressable storage locations.

33. A method for controlling a plurality of input/output (I/O) pins comprising the steps of:

a) at reset or end of a bus cycle, determining if a subsequent bus cycle is scheduled to begin immediately by a pin control unit;

b) if a subsequent bus cycle is scheduled to begin immediately, causing the scheduled bus cycle to begin;

c) if a subsequent bus cycle is not scheduled to begin immediately, c.1) storing a first and a second plurality of control bit values into a first and a second plurality of addressable storage locations coupled to pull-up and pull-down devices of a first plurality of output buffers associated with a first plurality of I/O pins by a pin control unit controlling the I/O pins, to simultaneously disable the pull-up and the pull-down devices of the first output buffer; and c.2) inverting contents of a port register corresponding to the first plurality of I/O pins, and storing the inverted content to the second plurality of addressable storage locations coupled to the pull-down devices of the first plurality of output buffers.

34. A method for controlling a plurality of input/output (I/O) pins comprising the steps of:

a) at reset or end of a bus cycle, determining if a subsequent bus cycle is scheduled to begin immediately by a pin control unit;

b) if a subsequent bus cycle is scheduled to begin immediately, causing the scheduled bus cycle to begin;

c) if a subsequent bus cycle is not scheduled to begin immediately, c.1) inverting contents of a port register corresponding to a first plurality of I/O pins, and storing the inverted content to a first as well as a second plurality of addressable storage locations coupled to pull-up and pull-down devices of a first plurality of output buffers associated with a first plurality of pins;

c.2) waiting a predetermined time period; and c.1) storing a first plurality of control bit values into the first plurality of addressable storage locations coupled to the pull-up and pull-down devices of the first plurality of output buffers associated with a first plurality of I/O pins by the pin control unit, to disable the pull-up and pull-down devices of the first plurality of output buffers.

35. A method for perform input/output (I/O) through a plurality of I/O pins, comprising the steps of:

a) receiving input data values from selected one of a plurality of I/O pins to corresponding ones of a first plurality of addressable storage locations being operated to control I/O through the I/O pins; and b) moving the input data values from the selected ones of the first plurality of addressable storage locations to selected ones of a second plurality of addressable storage locations being operated as one or more temporary storage elements of a datapath of a processor by way of one or more I/O port buses under the control of an I/O pin control unit.

36. The method as set forth in claim 35, wherein the temporary storage elements of the datapath of the processor include one or more of an accumulator and operand registers.

37. A method for perform input/output (I/O) through a plurality of I/O pins, comprising the steps of:

c) moving output data values stored in selected ones of a first plurality of addressable storage locations being operated as one or more temporary storage elements of a datapath of a processor to selected ones of a second plurality of addressable storage locations being operated to control I/O through a plurality of I/O pins by way of one or more I/O port buses under the control of an I/O pin control unit; and d) in response, outputting the output data values by I/O pins coupled to the selected ones of the second plurality of addressable storage locations.

38. The method as set forth in claim 37, wherein the temporary storage elements of the datapath of the processor include one or more of an accumulator and operand registers.

* * * * *